United States Patent [19]
Kamegawa et al.

[11] Patent Number: 5,322,106
[45] Date of Patent: Jun. 21, 1994

[54] PNEUMATIC TIRES WITH VARYING BLOCK HEIGHT

[75] Inventors: Tatsuhiko Kamegawa, Kodaira; Yukio Nakajima, Akigawa, both of Japan

[73] Assignee: Bridgestone Corporation, Tokyo, Japan

[21] Appl. No.: 881,218

[22] Filed: May 11, 1992

[30] Foreign Application Priority Data

May 5, 1991 [JP] Japan ............................. 3-133631
May 9, 1991 [JP] Japan ............................. 3-133630

[51] Int. Cl.⁵ .......................................... B60C 11/11
[52] U.S. Cl. .......................................... 152/209 R
[58] Field of Search ........... 152/209 R, 209 A, 209 D

[56] References Cited

U.S. PATENT DOCUMENTS

| | | |
|---|---|---|
| 4,258,691 | 3/1981 | Nakayama . |
| 4,722,378 | 2/1988 | Carolla et al. . |
| 4,865,099 | 9/1989 | Goergen ..................... 152/209 R |

FOREIGN PATENT DOCUMENTS

| | | | |
|---|---|---|---|
| 2317112 | 2/1977 | France ................. 152/209 |
| 0162307 | 7/1988 | Japan ................. 152/209 D |
| 3112702 | 5/1991 | Japan . |
| 3112703 | 5/1991 | Japan ................. 152/209 |
| 3204308 | 9/1991 | Japan . |

OTHER PUBLICATIONS

Patent Abstracts of Japan, vol. 10, No. 342 (N-536)(2398) Nov. 19, 1986.

Primary Examiner—Caleb Weston
Assistant Examiner—Nancy T. Krawczyk
Attorney, Agent, or Firm—Sughrue, Mion, Zinn, Macpeak & Seas

[57] ABSTRACT

A pneumatic tire having an outer surface of a tread portion divided into a tread pattern by grooves, in which each of the grooves has an intersect portion and an angle of an island portion surrounded by said intersect portion is different from that of another part at the same island portion. In such a tire, running performances on dry road are improved by making a distance in radial direction from an outer surface of the tread portion to a bottom of the groove at the intersect portion larger as the angle becomes smaller.

2 Claims, 9 Drawing Sheets

FIG_1

FIG_2

FIG_3

FIG_4

FIG_5

FIG_6

FIG_7

FIG_8

FIG_9

FIG_10

FIG_11

FIG_12

FIG_13

FIG_14

FIG_15

PNEUMATIC TIRES WITH VARYING BLOCK HEIGHT

BACKGROUND OF THE INVENTION

1. Field of the Invention

This invention relates to a pneumatic tire having a tread pattern of an outer surface of a tread defined by grooves.

2. Description of the Related Art

As a tread pattern of the pneumatic tire, there have hitherto been known a so-called rib type pattern in which plural main grooves extending zigzag in the circumferential direction are formed on the outer surface of the tread portion to form plural ribs located between adjoining main grooves and between the main groove and the tread end, or a so-called block type pattern in which plural main grooves extending in the circumferential direction and plural transverse grooves extending substantially extending in the axial direction and crossing with the main grooves are formed on the outer surface of the tread portion to form many polygonal blocks.

In the conventional pneumatic tire, however, maximum cornering force largely lowers at a large steering angle to degrade running performances of the tire on dry road.

SUMMARY OF THE INVENTION

The inventors have made various studies in order to elucidate the cause of lowering the maximum cornering force at such a large steering angle, and found out the following facts. Since rubber is generally noncompressive (when pressure is applied to rubber, the deformation occurs but the volume is unchangeable), when island portions of the tread such as ribs and the like made from rubber are contacted with ground, the island portions are crushed in the radial direction under loading to escape (expand) in a direction parallel to the ground contacting surface. In this case, when an angle of the island portion surrounded by an intersect portion of the grooves is small, an occupying ratio of the island portion in the vicinity of the intersect portion is low and a space escaping rubber is wide, so that the ground contact pressure of the island portion becomes low. On the other hand, when the angle of the island portion is large, the occupying ratio of the island portion in the vicinity of the intersect portion is high and the space escaping rubber is narrow, so that the ground contact pressure of the island portion becomes high. If the ground contact pressure is ununiform in the island portions of the tread, side force concentrates in a portion having a high ground contact pressure in accordance with the increase of the steering angle and consequently maximum cornering force lowers. Moreover, when the tread portion is comprised of many polygonal blocks each having sides of different lengths, rubber quantity deforming in the vicinity of a center of short side is small and is largely crushed in the radial direction to lower the ground contact pressure, while rubber quantity deforming in the vicinity of a center of long side is large and the crushed quantity in the radial direction is smaller than that in the vicinity of the center of the short side to increase the ground contact pressure. Such an ununiformity of the ground contact pressure brings about the lowering of the maximum cornering force as mentioned above.

The invention is based on the above knowledges and lies in a pneumatic tire having an outer surface of a tread portion divided into a tread pattern by grooves, in which each of said grooves has an intersect portion and an angle of an island portion surrounded by said intersect portion is different from that of another part at the same island portion, characterized in that a distance in radial direction from an outer surface of the tread portion to a bottom of the groove at the intersect portion is made larger as the angle becomes smaller.

That is, plural main grooves extending zigzag in the circumferential direction are formed on the outer surface of the tread portion to form plural ribs between these main grooves and between the main groove and tread end, in which the distance in radial direction from the outer surface of the rib to the bottom of the main groove at the intersect portion of the main groove formed by the zigzag folding thereof is made large as the angle of the rib folded at the intersect portion becomes small.

Further, when many polygonal blocks are formed by arranging plural main grooves extending in the circumferential direction and plural transverse grooves extending substantially in the axial direction and crossing with the main grooves in the outer surface of the tread, the distance in radial direction from the outer surface of the block to the bottom of the main groove at the corner portion of the block formed by the intersection between the main groove and the transverse groove is made large as the angle of the intersect portion becomes small. Moreover, when the outer surface of the block is defined by sides having different lengths, the distance in radial direction from the bottom of the main groove to the outer surface in the vicinity of center of the longest side, the distance in radial direction from the bottom of the main groove to the outer surface in the vicinity of center of the shortest side, and the distance in radial direction from the outer surface to the bottom of the main groove in the corner portion of the block are made larger in this order.

As previously mentioned, the ground contact pressure of the island portion of the tread running on road surface is low in a portion that the angle of the intersect portion defined by the groove is small and high in a portion that the angle is large. Therefore, according to the invention, the distance in radial direction from the outer surface of the tread to the bottom of the main groove at the intersect portion is made larger as the angle becomes small, whereby the rubber quantity in the vicinity of the intersect portion having a small angle is increased to increase the ground contact pressure, while the rubber quantity in the vicinity of the intersect portion having a large angle is decreased to reduce the ground contact pressure and hence the ground contact pressure in each island portion is equalized over the whole of the tread. As a result, even if the steering angle becomes large, the concentration of side force into a portion having a higher ground contact pressure is mitigated to prevent the lowering of maximum cornering force.

Furthermore, the invention is applied to so-called rib-type and block-type patterns for the equalization of the ground contact pressure.

Since the central portion of the rib in widthwise direction and the central surface portion of the block are surrounded by rubber, there is no escaping portion for rubber during the ground contacting and hence the ground contact pressure becomes maximum. Therefore, the distance in radial direction of such a portion is made minimum to further equalize the ground contact pressure over the whole of the rib or block.

When the outer surface of the block is comprised of sides having different lengths, the ground contact pressure of the block is low in the vicinity of center of short side and high in the vicinity of center of long side. For this purpose, the ground contact pressure can be equalized by making large the distance in radial direction from the bottom of the main groove to the outer surface in the vicinity of center of longest side, distance in radial direction from the bottom of main groove to the outer surface in the vicinity of center of shortest side and distance in radial direction from the outer surface of the block corner portion to the bottom of the main groove in this order, or by minimizing the distance in radial direction from the bottom of the main groove in the surface center of block to the outer surface, or by making large the distances in radial direction from the bottom of the main groove to the outer surface as the length of the side becomes short when the kind of length of the side is not less than three.

BRIEF DESCRIPTION OF THE DRAWINGS

The invention will be described with reference to the accompanying drawings, wherein.

DESCRIPTION OF THE PREFERRED EMBODIMENTS

Figure 1:
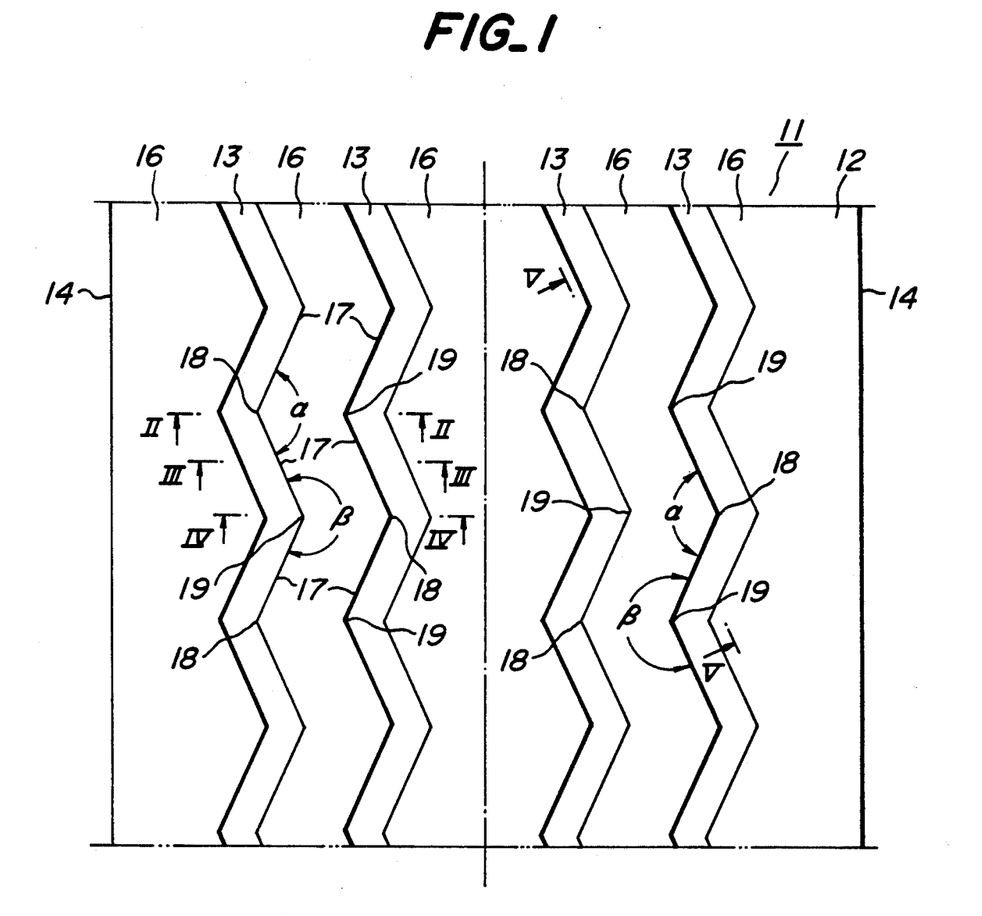
FIG. 1 is an exploded view of a first embodiment of the pneumatic tire according to the invention.
Figure 2:
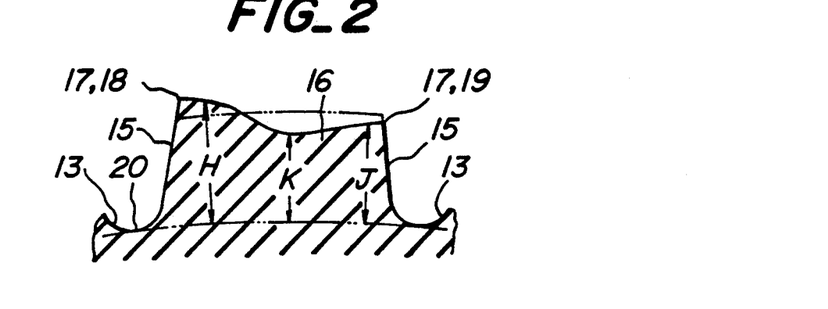
FIG. 2 is a sectional view of FIG. 1 taken along a line of II—II.
Figure 3:
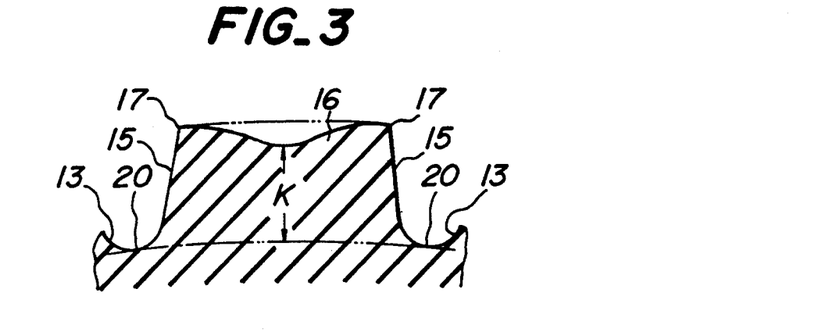
FIG. 3 is a sectional view of FIG. 1 taken along a line of III—III.
Figure 4:
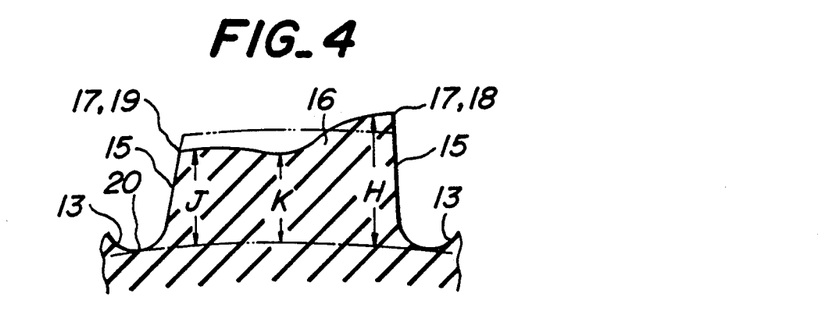
FIG. 4 is a sectional view of FIG. 1 taken along a line of IV—IV.
Figure 5:
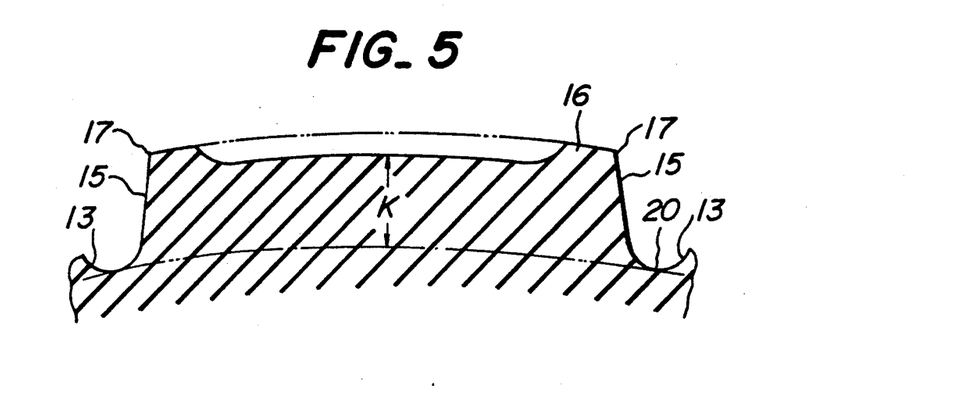
FIG. 5 is a sectional view of FIG. 1 taken along a line of V—V.

In FIG. 1 is shown a first embodiment of a pneumatic tire 11 according to the invention. In the tire 11, plural main grooves, four main grooves 13 in the illustrated embodiment extending in the circumferential direction are formed on an outer surface of a tread portion 12. These main grooves 13 are folded zigzag at same pitch and amplitude and arranged in the circumferential direction at same phase. As a result, plural ribs extending zigzag in the circumferential direction, particularly five ribs 16 in the illustrated embodiment are formed between the adjoining main grooves 13 and between the outermost main groove 13 and tread end 14. Numeral 17 is a boundary between an outer surface of the rib 16 and a sidewall 15 of the main groove 13, i.e. an edge segment of an intersect portion defined between the outer surface of the rib 16 and the sidewall 15 of the main groove 13. An edge line comprised of these edge segments 17 extends zigzag along the main groove 13 in the circumferential direction, and consequently the two edge segments 17 adjacent to each other in the circumferential direction intersect with each other at an intersect angle $\alpha$ of less than 180° or an intersect angle $\alpha$ of more than 180°. When such a tire 11 is run under loading, since rubber is incompressible, the rib 16 is crushed in the radial direction to escape in a direction parallel to ground contacting surface (i.e. a direction of expanding toward the inside of the main groove 13). In this case, an occupying ratio of the rib 16 to a space surrounding it is low in the vicinity of an intersect portion (protrusion end) 18 wherein the intersect angle $\alpha$ between the edge segments 17 is less than 180° and the space for escaping rubber is wide, so that the ground contact pressure of the rib 16 in the vicinity of such an intersect portion 18 becomes low, while the occupying ratio of the rib 16 is high in the vicinity of an intersect portion (concave end) 19 wherein the intersect angle $\alpha$ between the edge segments 17 is more than 180° and the space for escaping rubber is narrow, so that the ground contact pressure of the rib in the vicinity of such an intersect portion 19 becomes high. On the other hand, a central portion in widthwise direction of the rib 16 is surrounded by rubber, so that there is no space for escaping rubber during the contacting with ground and hence the ground contact pressure in the central portion in widthwise direction of the rib 16 is higher than that in the vicinity of the intersect portion 19 and becomes maximum. Thus, when the ground contact pressure is ununiform in the portions of the rib 16 in the widthwise direction, as the steering angle becomes large, side force concentrates in a portion having a high ground contact pressure, and consequently the maximum cornering force lowers.

According to the invention, therefore, as shown in FIGS. 2 to 5, a distance in radial direction H from the outer surface of the rib 16 to a bottom 20 of the main groove 13 in the vicinity of the intersect portion 18 having a small intersect angle $\alpha$ is made large as compared with a distance in radial direction J from the outer surface of the rib 16 to the bottom 20 of the main groove 13 in the vicinity of the intersect portion 19 having a large intersect angle $\beta$. In this case, the vicinity of the intersect portion 18 is protruded outward in the radial direction from a sectional profile of the tread portion shown by phantom line, while the vicinity of the intersect portion 19 is dented inward in the radial direction from the sectional profile of the tread portion 12 and also a distance in radial direction K from the outer surface of the rib 16 to a bottom 20 of the main groove 13 at a central portion in widthwise direction of the rib 16 is made smaller than the minimum value of the distance in radial direction in the vicinity of the intersect portion, i.e. the radial distance J. The outer surfaces of these portions of the rib in the widthwise direction are connected to each other in form of smooth curve. Moreover, the term "bottom 20 of the main groove 13" used herein means a curve (shown by phantom line) connecting bottoms of a pair of the main grooves 13 arranged in both sides of the rib 16 to each other and in parallel with the sectional profile of the tread portion 12. Consequently, rubber quantity in the vicinity of the intersect portion 18 having a small intersect angle $\alpha$ is increased to increase the ground contact pressure in the vicinity of the intersect portion 18, while rubber quantity in the vicinity of the intersect portion 19 having a large intersect angle $\beta$ is decreased to reduce the ground contact pressure in the vicinity of the intersect portion 19 and also rubber quantity in the central portion in widthwise direction of the rib 16 is most decreased to most reduce the ground contact pressure in this portion. Thus, the ground contact pressure is equalized over the whole of the rib in the widthwise direction. As a result, even if the steering angle becomes large during the running of the tire 11, the concentration of side force into the portion having the high ground contact pressure is mitigated to prevent the lowering of maximum cornering force. Moreover, the difference (mm) between the radial distance H and the radial distance J is preferably within a range of 0.005 to 0.015 times of the difference (degree) between the intersect angle $\alpha$ and the intersect angle $\beta$ as an absolute value. When the difference is less than 0.005 times, the equalization of ground contact pressure is insufficient, while when it exceeds 0.015 times, the ground contact pressure in the vicinity of the intersect portion 18 extremely increases and also the ground contact pressure in the vicinity of the intersect portion 19 extremely decreases and hence the ground contact pressure is rather inequalized. In addition, the difference (mm) between the radial distance K and the minimum value of the radial distance in the vicinity of the intersect portion, the radial distance J in the illustrated embodiment is preferably within a range of 0.3 to 0.8.

In the above illustrated embodiment, there are two large and small intersect angles at the intersect portion, but three or more intersect angles may be taken. In the latter case, the distance in radial direction from the outer surface of the rib to the bottom of the main groove is made larger as the intersect angle becomes small.

Figure 6:
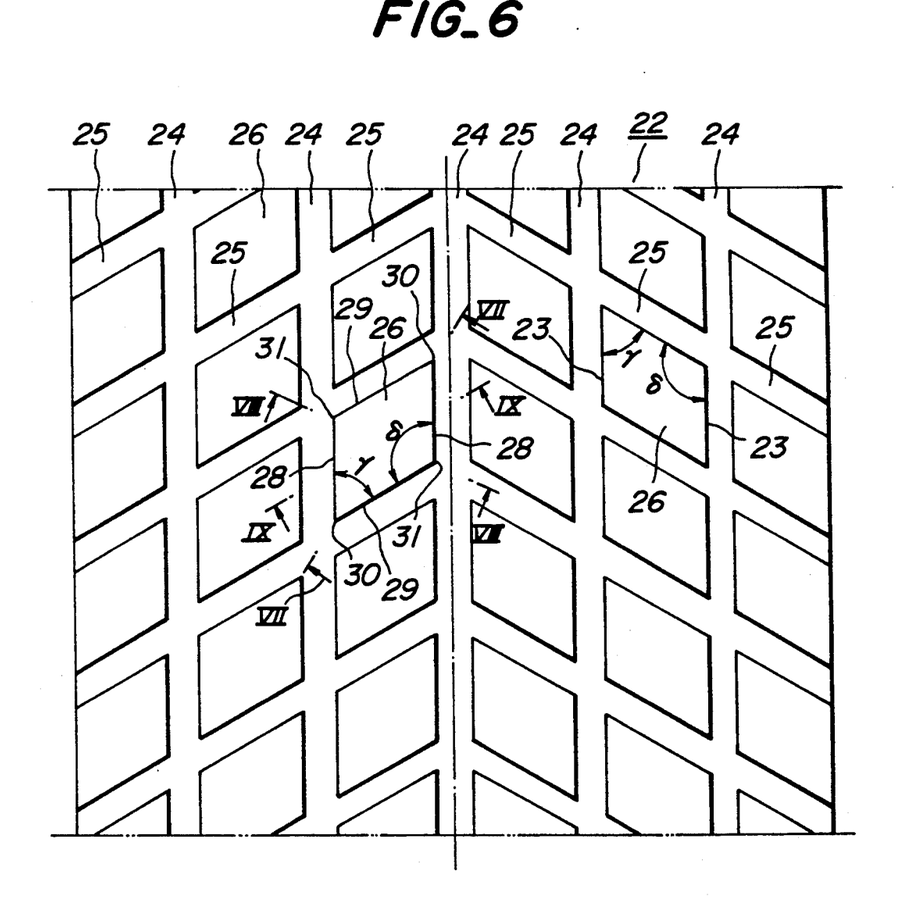
FIG. 6 is an exploded view of a second embodiment of the tread portion according to the invention.
Figure 7:
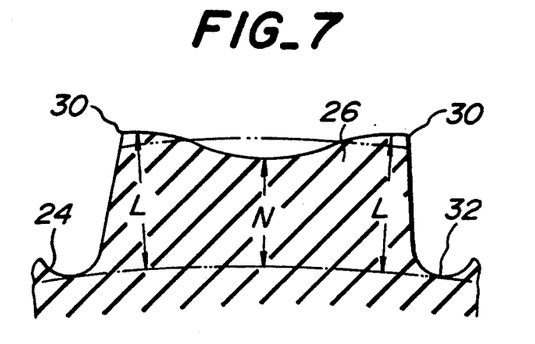
FIG. 7 is a sectional view of FIG. 6 taken along a line of VII—VII.
Figure 8:
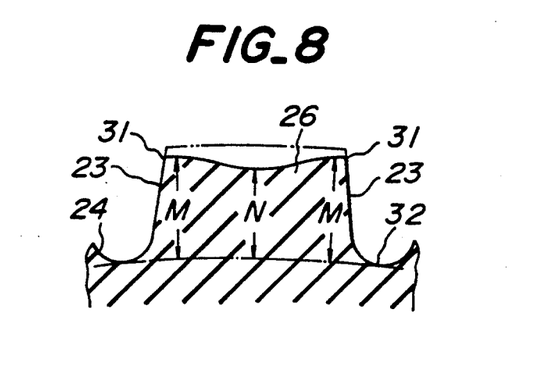
FIG. 8 is a sectional view of FIG. 6 taken along a line of VIII—VIII.
Figure 9:
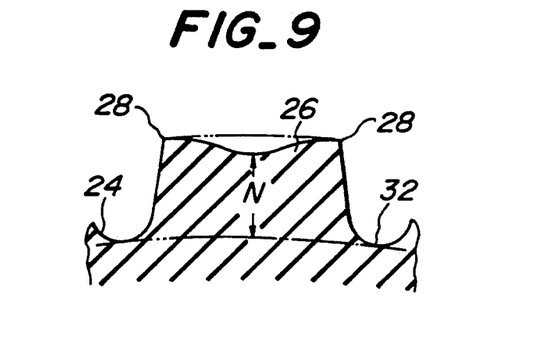
FIG. 9 is a sectional view of FIG. 6 taken along a line of IX—IX.

In FIG. 6 is shown a second embodiment of the pneumatic tire according to the invention, in which plural main grooves 24 extending straightforward in the circumferential direction and plural transverse grooves 25 extending substantially in the axial direction and crossing with the main grooves 24 are arranged in an outer surface of a tread portion 22 to form a great amount of blocks 26 having a polygonal shape, parallelograms in the illustrated embodiment. Even in these blocks 26, edge segments 28 29 are formed in boundaries among the outer surface of the block 26, sidewall 23 of the main groove 24 and sidewall of the transverse groove 25, i.e. intersect portions between the outer surface of the block 26 and sidewalls of the main and transverse grooves. As a result, a corner portion 30 defined by intersecting the edge segments 28, 29 at an intersect angle $\gamma$ of less than 90° and a corner portion 31 defined by intersecting the edge segments 28, 29 at an intersect angle $\delta$ of more than 90° are formed in each of the blocks 26. In this case, the ground contact pressure is low int he vicinity of the corner portion 30 having a smaller intersect angle $\gamma$ and the ground contact pressure in the vicinity of the corner portion 31 having a large intersect angle $\delta$ is high likewise the aforementioned case, and hence the ground contact pressure is ununiform over the whole of the block to lower the maximum cornering force. According to the invention, therefore, as shown in FIGS. 7 to 9, a distance in radial direction L from the outer surface of the block 26 to a bottom 32 of the main groove 24 in the vicinity of the corner portion 30 having a small intersect angle $\gamma$ is made larger than a distance in radial direction M form the outer surface of the block 26 to a bottom 32 of the main groove 24 in the vicinity of the corner portion 31 having a larger intersect angle $\delta$. In other words, the vicinity of the corner portion 30 is protruded outward in the radial direction from the sectional profile (shown by phantom line) of the tread portion 22, while the vicinity of the corner portion 31 is dented inward in the radial direction from the sectional profile of the tread portion 22. Since a central portion of each block 26 at its outer surface is surrounded by rubber and is highest in the ground contact pressure, a distance in radial direction N from the outer surface of the block 26 to the bottom 32 of the main groove 24 at the central portion of the block is made smaller than a minimum value of the radial distance in the vicinity of the corner portion, i.e. the radial distance M in the illustrated embodiment. Further, the outer surfaces of these portions of each block 26 are connected to each other in form of a smooth curve. As a result, the ground contact pressure in the vicinity of the corner portion 30 is increased, while the ground contact pressure in the vicinity of the corner portion 31 is decreased and also the ground contact pressure in the central portion of the block 26 is most decreased, whereby the ground contact pressure over the whole of the block 26 is equalized. Therefore, even if the steering angle becomes larger, the concentration of side force into a portion having a high ground contact pressure is mitigated to prevent the lowering of maximum cornering force. In this case, the difference (mm) between the radial distance L and the radial distance M is preferably within a range of 01.01 to 0.025 times of the difference (degree) between the intersect angle $\gamma$ and the intersect angle $\delta$ as an absolute value. When the difference is less than 0.01 times, the equalization of the ground contact pressure is insufficient, while when it exceeds 0.025 times, the ground contact pressure in the vicinity of the corner portion 30 too increases and the ground contact pressure in the vicinity of the corner portion 31 too decreases and, as a result, the ground contact pressure in the block is rather ununiform. The difference (mm) between the radial distance N and the minimum value of the radial distance in the corner portion, i.e. radial distance M in the illustrated embodiment is preferably within a range of 0.3 to 0.8.

In the above illustrated embodiment, there are two large and small intersect angles, but three or more intersect angles may be taken. In the latter case, the distance in the radial direction from the outer surface of the block to the bottom of the main groove int he corner portion is made large as the intersect angle becomes small. Furthermore, the outer surface of the block 26 is convex polygonal in the illustrated embodiment, but it may be concave polygonal such as T-shaped form or the like.

The invention will be described with respect to the following experimental example.

In this experiment, there were provided a comparative tire 1 having a tread pattern as shown in FIG. 1 in which distances in radial direction from the outer surface of the rib 16 to the bottom 20 of the main groove 13 in the vicinities of the intersect portions 18, 19 and the central portion in widthwise direction of the rib 16 were the same, a test tire 1 having a tread pattern as shown in FIG. 1 in which the difference between the radial distance H in the vicinity of the intersect portion 18 and the radial distance J in the vicinity of the intersect portion 19 was 1 mm and the difference between the radial distance K in the central portion in widthwise direction of the rib 16 and the radial distance J in the vicinity of the intersect portion 19 was 0.5 mm, a comparative tire 2 having a tread pattern as shown in FIG. 6 in which distances in radial direction from the outer surface of the block 26 to the bottom 32 of the main groove 24 in the vicinities of the corner portions 30, 31 and the central portion of the block 26 were the same, and a test tire 2 having a tread pattern as shown in FIG. 6 in which the difference between the radial distance L in the vicinity of the corner portion 30 and the radial distance M in the vicinity of the corner portion 31 was 1 mm and the difference between the radial distance N in the central portion of the block 26 and the radial distance M in the vicinity of the corner portion 13 was 0.5 mm. In the comparative tire 1 and the test tire 1, the rib 16 had an intersect angle $\alpha$ of 120° and an intersect angle $\beta$ of 240°, while in the comparative tire 2 and the test tire 2, the block 26 had an intersect angle $\gamma$ of 60° and an intersect angle $\delta$ of 120°. Each of these tires had a tire size of 205/60 R15. Then, each of these tiers was inflated under an internal pressure of 2 kgf/cm$^2$ and run on a drum at a speed of 30 km/hr under a load of 360 kgf, during which slip angle was variously changed to measure maximum cornering force. The measured results are shown in Table 1 and FIGS. 10 and 11.

TABLE 1

| | Maximum cornering force (kgf) Slip angle | | | | | | Running performances on dry road by feeling |
|---|---|---|---|---|---|---|---|
| | 2° | 4° | 7° | 8° | 10° | 12° | |
| Comparative tire 1 | 230 | 343 | 365 | 372 | 368 | 350 | 100 |
| Test tire 1 | 231 | 345 | 371 | 383 | 384 | 386 | 103 |
| Comparative tire 2 | 225 | 336 | 354 | 361 | 357 | 343 | 100 |
| Test tire 2 | 225 | 336 | 359 | 370 | 371 | 372 | 104 |

Figure 10:
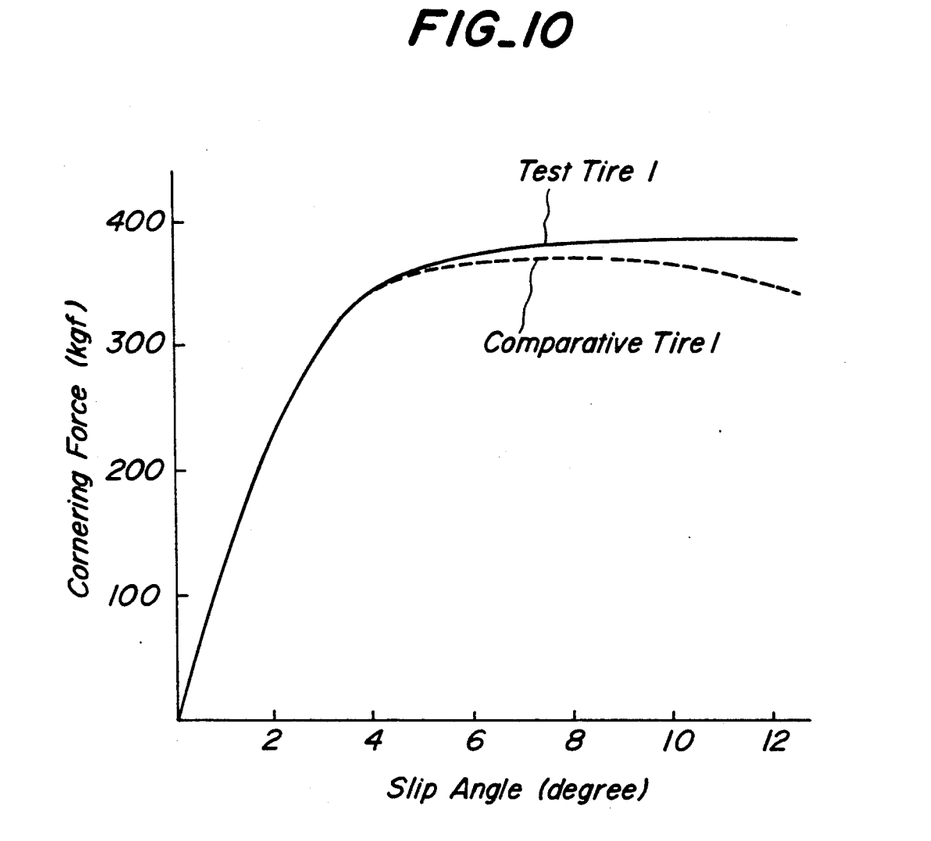
FIG. 10 is a graph showing a value of maximum cornering force to a slip angle.
Figure 11:
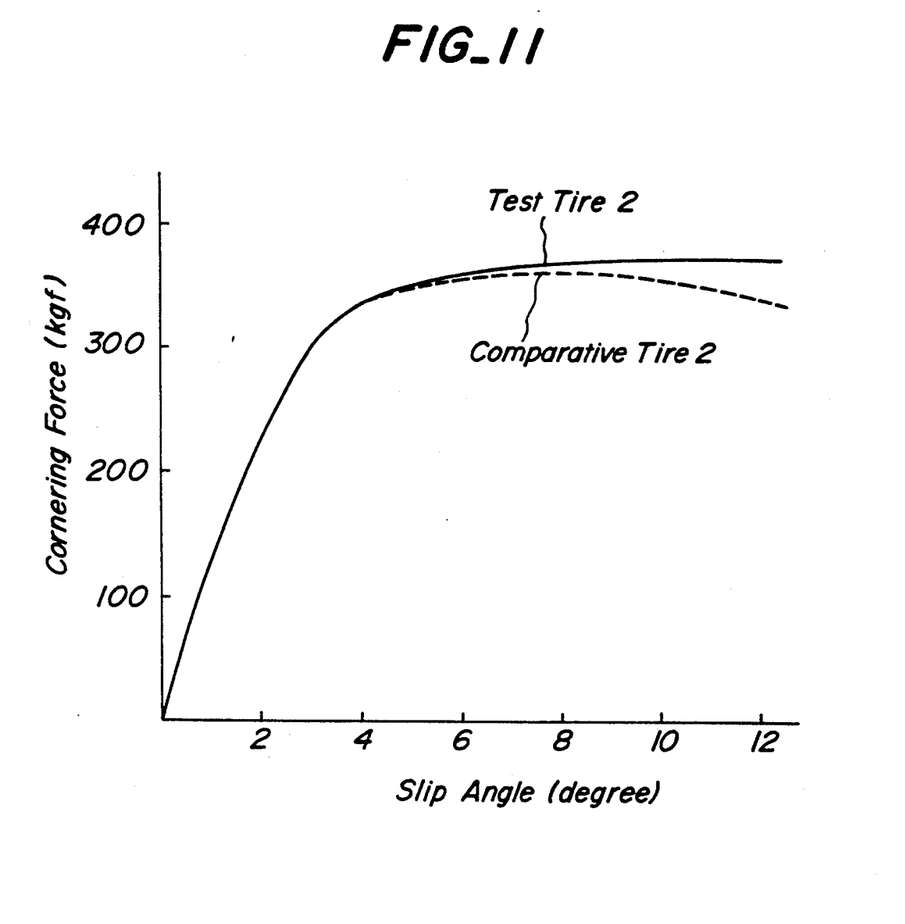
FIG. 11 is another graph showing a value of maximum cornering force to a slip angle.

As seen from FIGS. 10 and 11, the maximum cornering force in the comparative tires largely reduces as the slip angle become large (the steering angle become large), while the maximum cornering force in the test tires does not reduce but slightly increases.

Furthermore, each of these comparative tires 1 and 2 and the test tires 1 and 2 was mounted onto a passenger car and run on winding road, during which running performances on dry road were evaluated by a feeling test of a professional driver. In this case, the running performances were shown by an index value on the basis that the comparative tire was 100, in which the larger the index value, the better the performances. The results are also shown in Table 1. As seen from the results of Table 1, the running performances on dry road in the test tires are excellent as compared with those of the comparative tires.

Figure 12:
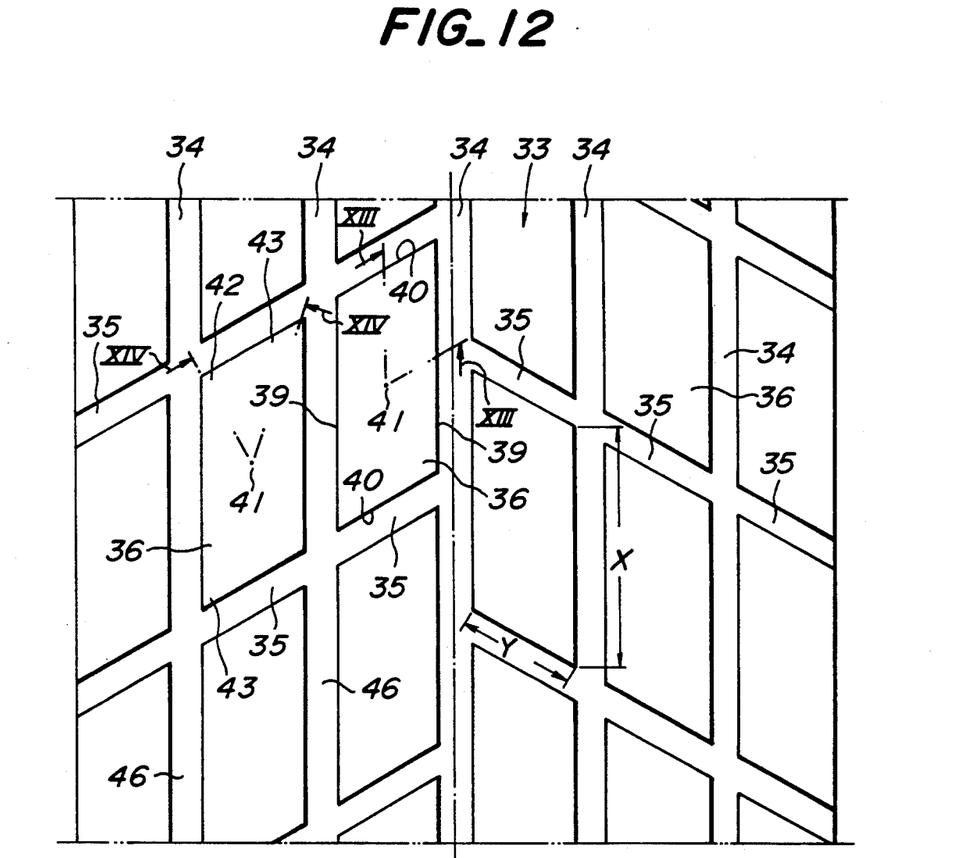
FIG. 12 is an exploded view of a third embodiment of the tread portion according to the invention.

In FIG. 12 is shown a third embodiment of the pneumatic tire according to the invention. In this tire, plural main grooves 34 extending in the circumferential direction of the tire, five straight main grooves in the illustrated embodiment are formed in an outer surface of a tread portion 33. Furthermore, plural transverse grooves 35 extending substantially in the axial direction of the tire (inclined at a small angle with respect to the axial direction in the illustrated embodiment) are formed in each half of the tread portion 33 so as to cross with the main grooves and arranged so as to separate from each other at an equal interval in the circumferential direction, in which a group of the transverse grooves in the right-side half of the tread portion is shifted at a given pitch with respect to a group of the transverse grooves in the left-side half of the tread portion. Thus, a great amount of blocks 36 having a convex polygon (all interior angles are less than 180°), parallelograms in the illustrated embodiment are defined in the outer surface of the tread portion 33 by the main grooves 34 and the transverse grooves 35. Each of these blocks 36 is comprised of two or more kinds of sides, i.e. a pair of long sides 39 extending in the circumferential direction and a pair of short sides 40 extending substantially in the axial direction in the illustrated embodiment. When such a tire is run under loading, since rubber is incompressive, the blocks 36 are crushed in the radial direction to escape in parallel to the ground contacting surface (expand toward insides of the main groove 34 and the transverse groove 35). In this case, however, rubber quantity of the block 36 deforming in the vicinity of the short side 40 is less, so that the block is largely crushed to lower the ground contact pressure, while rubber quantity of the block 36 deforming in the vicinity of the long side 39 is larger than that in the vicinity of the short side 40 and the crushed quantity in the radial direction is small as compared with the vicinity of the short side 40 and hence the ground contact pressure becomes higher than that of the vicinity of the short side 40. Further, the central surface portion of each block 36 is surrounded by rubber and there is no space for escaping rubber, so that the ground contact pressure in the central portion of the block 36 is higher than that in the vicinity of the long side 39 and becomes maximum. Moreover, corner portions of each block 36, i.e. a pair of obtuse-angled portions 42 and a pair of acute-angled portions 43 have an interior angle of less than 180° (because the long side 39 and short side 40 are straight), so that rubber quantity deforming in the corner portions is less than that in the vicinity of each side (long side 39, short side 40) and hence the crushed quantity in the radial direction of these obtuse-angled portion 42 and acute-angled portion 43 becomes larger than that in the vicinity of the short side 40 and the ground contact pressure is lower than that in the vicinity of the short side 40 and becomes minimum. As a result, the ground contact pressure is ununiform over the whole of the block 36, so that side force concentrates into a portion having a high ground contact pressure as the steering angle becomes large to lower maximum cornering force.

Figure 13:
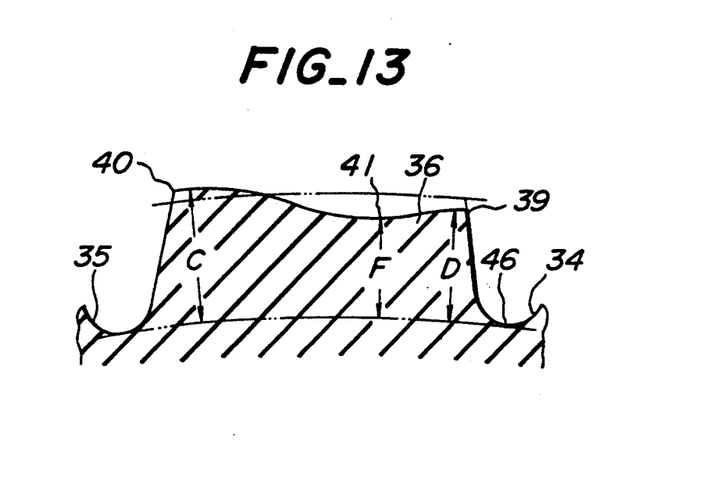
FIG. 13 is a sectional view of FIG. 12 taken along a line XIII—XIII.
Figure 14:
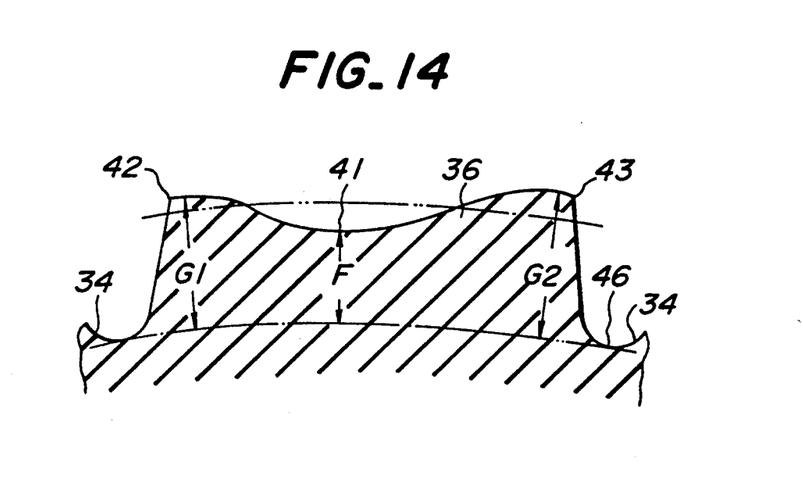
FIG. 14 is a sectional view of FIG. 12 taken along a line of XIV—XIV.

According to the invention, therefore, as shown in FIGS. 13 and 14, a distance in radial direction C from a bottom 46 of the main groove 34 to the outer surface of the block 36 in the vicinity of a shortest side among sides in the outer surface of the block 36, i.e. the short side 40 in the illustrated embodiment is made larger than a distance in radial direction D from the bottom 46 of the main groove 34 to the outer surface in the vicinity of a longest side among sides in the outer surface of the block 36, i.e. the long side 39 in the illustrated embodiment. In other words, the vicinity of the short side 40 is protruded outward in the radial direction from a sectional profile of the tread portion 33 shown by phantom line, while the vicinity of the long side 39 is dented inward in the radial direction from the sectional profile of the tread portion 33. As a result, rubber quantity in the vicinity of the short side 40 is increased to increase the ground contact pressure in the vicinity of the short side 40, while rubber quantity in the vicinity of the long side 39 is decreased to reduce the ground contact pressure in the vicinity of the long side 39, whereby the ground contact pressure is equalized over the whole of the block 36. Furthermore, a distance in radial direction F from the bottom 46 of the main groove 34 to the outer surface in the central surface portion 41 of the block 36 is made smaller than the distance in radial direction from the bottom 46 of the main groove 34 to the outer surface in the vicinity of a longest side among sides of the block 36, i.e. radial distance D in the vicinity of the long side 39 in the illustrated embodiment, whereby the ground contact pressure in the central surface portion 41 showing a highest ground contact pressure is largely decreased to further equalize the ground contact pressure over the whole of the block 36. Moreover, distances in radial direction from the bottom 46 of the main groove 34 to the outer surface in the corner portions of the block 36, i.e. obtuse-angled portions 42 and acute-angled portions 43 are made larger than a distance in radial direction from the bottom 46 of the main groove 34 to the outer surface in the vicinity of a shortest side among sides of the block 36, i.e. radial distance C in the vicinity of the short side 40 in the illustrated embodiment, whereby the ground contact pressure in the obtuse-angled portion 42 and acute-angled portion 43 showing a lowest ground contact pressure is largely increased to more equalize the ground contact pressure over the whole of the block 36. In the latter case, the space for escaping rubber crushed in the obtuse-angled portion 42 is narrower than the space for escaping rubber crushed in the acute-angled portion 43, so that the ground contact pressure in the vicinity of the obtuse-angled portion 42 becomes higher than that in the vicinity of the acute-angled portion 43. For this end, according to the invention, a distance in radial direction G2 from the bottom 46 of the main groove 34 to the outer surface in the vicinity of the acute-angled portion 43 is made larger than a distance in radial direction G1 from the bottom 46 of the main groove 34 to the outer surface in the vicinity of the obtuse-angled portion 42, whereby the ground contact pressure in these corner portions is equalized. The outer surfaces of these portions in the block 36 having different heights are connected to each other in form of a smooth curve. The term "bottom 46 of main groove 34" used herein means a curve (shown by a phantom line) connecting bottoms of a pair of the main grooves 34 arranged at both sides of the block 36 in the axial direction and in parallel with the sectional profile of the tread portion 33.

When the ground contact pressure in each portion of the block 36 is equalized, even if the steering angle becomes large during the running of the tire, the concentration of side force into a portion having a high ground contact pressure is mitigated to prevent the lowering of maximum cornering force. According to the invention, the difference (mm) between the radial distance C and the radial distance D is preferably within a range of 0.5 to 2 times of a ratio (X-Y)/Y of difference between length X of the long side 39 and length Y of the short side 40 to length Y as an absolute value. When the difference is less than 0.5 times, the equalization of ground contact pressure is insufficient, while when it exceeds 2 times, the ground contact pressure in the vicinity of the short side 40 too increases and the ground contact pressure in the vicinity of the long side 39 too decreases and hence the ground contact pressure over the whole of the block becomes ununiform. Furthermore, the difference (mm) between the radial distance F and the radial distance D is preferably within a range of 0.1 to 0.5 times, and also the difference (mm) between the radial distance G1, G2 and the radial distance C is preferably within a range of 0.2 to 0.6.

In the above illustrated embodiment, the block 36 has two kind of sides, i.e. long side 39 and short side 40, but three or more kinds of sides may be taken. In the latter case, the distance in radial direction from the bottom 46 of the main groove 34 to the outer surface of the block 36 is made larger as the length of the side becomes short. Moreover, when the length of the side is same, the radial distance may be same.

The above embodiment will be described with respect to the following experimental example.

In this experiment, there were provided a comparative tire 3 having a tread pattern as shown in FIG. 12 in which all distances in radial direction from the bottom 46 of the main groove 34 to the outer surface of the block 36 in the vicinities of the long side 39 and short side 40, central surface portion 41 and obtuse-angled portion 42 and acute-angled portion 43 are the same, and a test tire 3 having a tread pattern as shown in FIG. 12 in which the difference between the radial distance C in the vicinity of the short side 40 and the radial distance D in the vicinity of long side 39 was 0.3 mm, the difference between the radial distance F in the central surface portion 41 of the block 36 and the radial distance D in the vicinity of the long side 39 was 0.3 mm, and the differences between the radial distances G1, G2 in the obtuse-angled portion 42 and acute-angled portion 43 and the radial distance C in the vicinity of the short side 40 were 0.2 mm and 0.4 mm, respectively. These tires had a tire size of 205/60 R15. In the block 36, the length X of the long side 39 was 40 mm, and the length Y of the short side 40 was 30 mm, and the interior angle of the obtuse-angled portion 42 was 120°, and the interior angle of the acute-angled portion 43 was 60°. Then, each of these tires was inflated under an internal pressure of 2 kgf/cm$^2$ and run on a drum at a speed of 30 km/hr under a load of 360 kgf, during which slip angle was variously changed to measure maximum cornering force. The measured results are shown in Table 2 and FIG. 15.

TABLE 2

| | Maximum cornering force (kgf) Slip angle | | | | | | Running performances on dry road by feeling |
| --- | --- | --- | --- | --- | --- | --- | --- |
| | 2° | 4° | 7° | 8° | 10° | 12° | |
| Comparative tire 3 | 225 | 336 | 354 | 361 | 357 | 343 | 100 |
| Test tire 3 | 225 | 337 | 361 | 372 | 373 | 374 | 105 |

Figure 15:
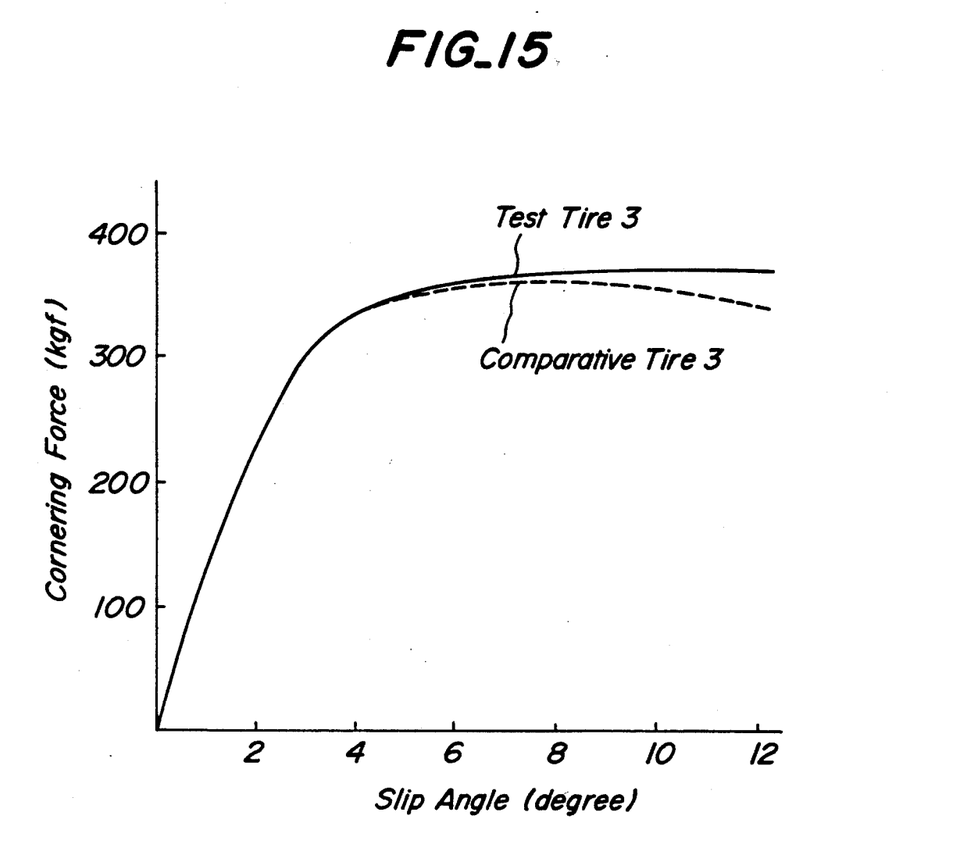
FIG. 15 is a graph showing a value of maximum cornering force to a slip angle.

As seen from FIG. 15, the maximum cornering force in the comparative tire 3 largely reduces as the slip angle become large (the steering angle become large), while the maximum cornering force in the test tire 3 does not reduce but slightly increases.

Furthermore, each of these comparative tire 3 and the test tire 3 was mounted onto a passenger car and run on winding road, during which running performances on dry road were evaluated by a feeling test of a professional driver. The results are also shown in Table 2. As seen from the results of Table 2, the running performances on dry road in the test tire are excellent as compared with those of the comparative tire.

As mentioned above, according to the invention, the running performances on dry road can be improved by preventing the lowering of maximum cornering force at a large steering angle.

What is claimed is:

1. A pneumatic tire having an outer surface of a tread portion divided into a tread pattern by grooves, in which each of said grooves has an intersect portion and an angle of an island portion surrounded by said intersect portion is different from that of another part at the same island portion, characterized in that a distance in radial direction from an outer surface of said tread portion to a bottom of said groove at said intersect portion is made larger with respect to a sectional profile of the tread portion as said angle becomes smaller, wherein many polygonal blocks are formed by arranging plural main grooves extending in the circumferential direction and plural transverse grooves extending substantially in the axial direction and crossing with the main grooves in the surface of said tread portion, and a distance in radial direction from the outer surface of said block to the bottom of said main groove at a corner portion of said block formed by intersection between the main groove and the transverse groove is made large with respect to a sectional profile of the tread portion as an angle of the intersect portion becomes small.

2. The pneumatic tire according to claim 1, wherein a distance in radial direction at a central surface portion of said block is made smaller than a minimum value of said radial distance in the vicinity of said corner portion.

* * * * *